United States Patent [19]
Myers

[11] Patent Number: 4,934,760
[45] Date of Patent: Jun. 19, 1990

[54] FRICTION BRAKE MECHANISM WITH AUTOMATIC SEQUENCING

[75] Inventor: Allen D. Myers, Decatur, Ill.

[73] Assignee: Caterpillar Inc., Peoria, Ill.

[21] Appl. No.: 428,010

[22] Filed: Oct. 26, 1989

Related U.S. Application Data

[63] Continuation of Ser. No. 45,264, Apr. 21, 1987, abandoned, which is a continuation of Ser. No. 820,879, Jan. 16, 1986, abandoned, which is a continuation of Ser. No. 562,941, Dec. 19, 1983, abandoned.

[51] Int. Cl.$^5$ .................. B60T 13/00; B60T 13/22; F16D 65/24
[52] U.S. Cl. .................. 303/6.01; 188/72.3; 188/170; 188/216; 188/349; 303/9.76; 303/71; 303/9.62
[58] Field of Search .................. 303/6.01, 7, 71, 9.61, 303/9.62, 9.66, 9.75, 9.76; 188/72.3, 170, 72.4, 72.5, 71.5, 72.1, 106, 364, 368, 152, 354, 16, 196, 71.8, 71.9, 347–352, 166–173, 3, 216; 92/177

[56] References Cited

U.S. PATENT DOCUMENTS

| | | | |
|---|---|---|---|
| 1,621,912 | 3/1927 | Van Derwyk | 188/349 |
| 1,818,334 | 8/1931 | Kazenmaier et al. | 188/170 X |
| 2,135,003 | 11/1938 | Harrison | 188/349 |
| 2,136,706 | 11/1938 | Ostrander | 188/349 |
| 2,291,033 | 7/1942 | Goepfrich | 303/6 C |
| 2,406,284 | 8/1946 | Fitch | 303/6 C |
| 2,526,968 | 10/1950 | Pontius III | 303/6 C |
| 2,808,902 | 10/1957 | Williams | 188/349 X |
| 2,911,263 | 11/1959 | Hill | 303/6 C |
| 2,991,797 | 7/1961 | Baldwin | 303/6 C X |
| 3,038,761 | 6/1962 | Kenrick | 303/6 C |
| 3,190,700 | 6/1965 | Fites | 303/6 C |
| 3,245,726 | 4/1966 | Stelzer | 303/6 C |
| 3,252,740 | 5/1966 | Stelzer | 303/6 C |
| 3,393,945 | 7/1968 | Reichard | 303/6 C |
| 3,692,147 | 9/1972 | Yeh et al. | 188/152 X |
| 3,815,480 | 6/1974 | Spyre | 92/177 X |
| 3,842,949 | 10/1974 | Newstead | 188/72.3 X |
| 3,917,037 | 11/1975 | Prillinger | 188/170 |
| 3,927,737 | 12/1975 | Prillinger et al. | 188/106 F |
| 3,944,027 | 3/1976 | Yamamoto | 188/170 X |
| 3,957,315 | 5/1976 | Cummins et al. | 303/6 C |
| 3,961,559 | 6/1976 | Teramachi | 92/177 X |
| 3,980,345 | 9/1976 | Doerfler | 188/349 X |
| 4,057,297 | 11/1977 | Beck et al. | 188/170 X |
| 4,080,877 | 3/1978 | DeFries | 92/177 X |
| 4,256,350 | 3/1981 | Hoefer | 303/71 X |
| 4,445,840 | 5/1984 | Kenmochi | 92/177 X |
| 4,535,873 | 8/1985 | Airheart | 92/177 X |

Primary Examiner—Douglas C. Butler
Attorney, Agent, or Firm—Kenneth A. Rhoads

[57] ABSTRACT

A friction brake mechanism having a pair of front brake assemblies and a pair of rear brake assemblies receives pressurized fluid at the same time and at the same pressure from a hydraulic control apparatus. Each of the brake assemblies has a brake piston movable in a chamber between a holding position and a releasing position and a plurality of brake plates and a plurality of brake disks interleaved with the brake plates. A first spring system is associated with the pair of front brake assemblies and a second spring system is associated with the rear brake assemblies. The first spring system provides a different force than the second spring system to cause the rear brake assemblies to be engaged a predetermined period of time ahead of the pair of front brake assemblies without any design change in the hydraulic control apparatus.

1 Claim, 2 Drawing Sheets

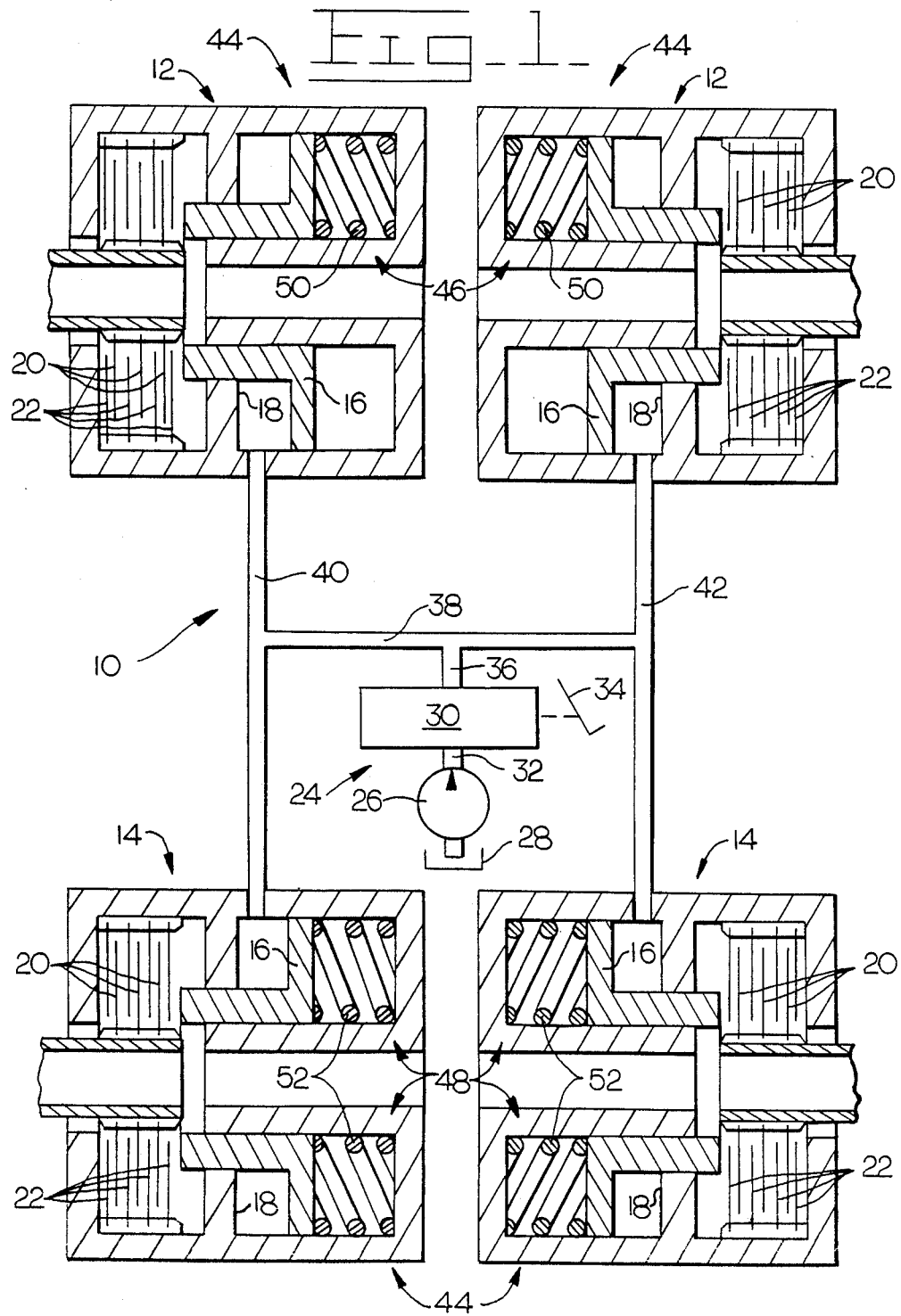

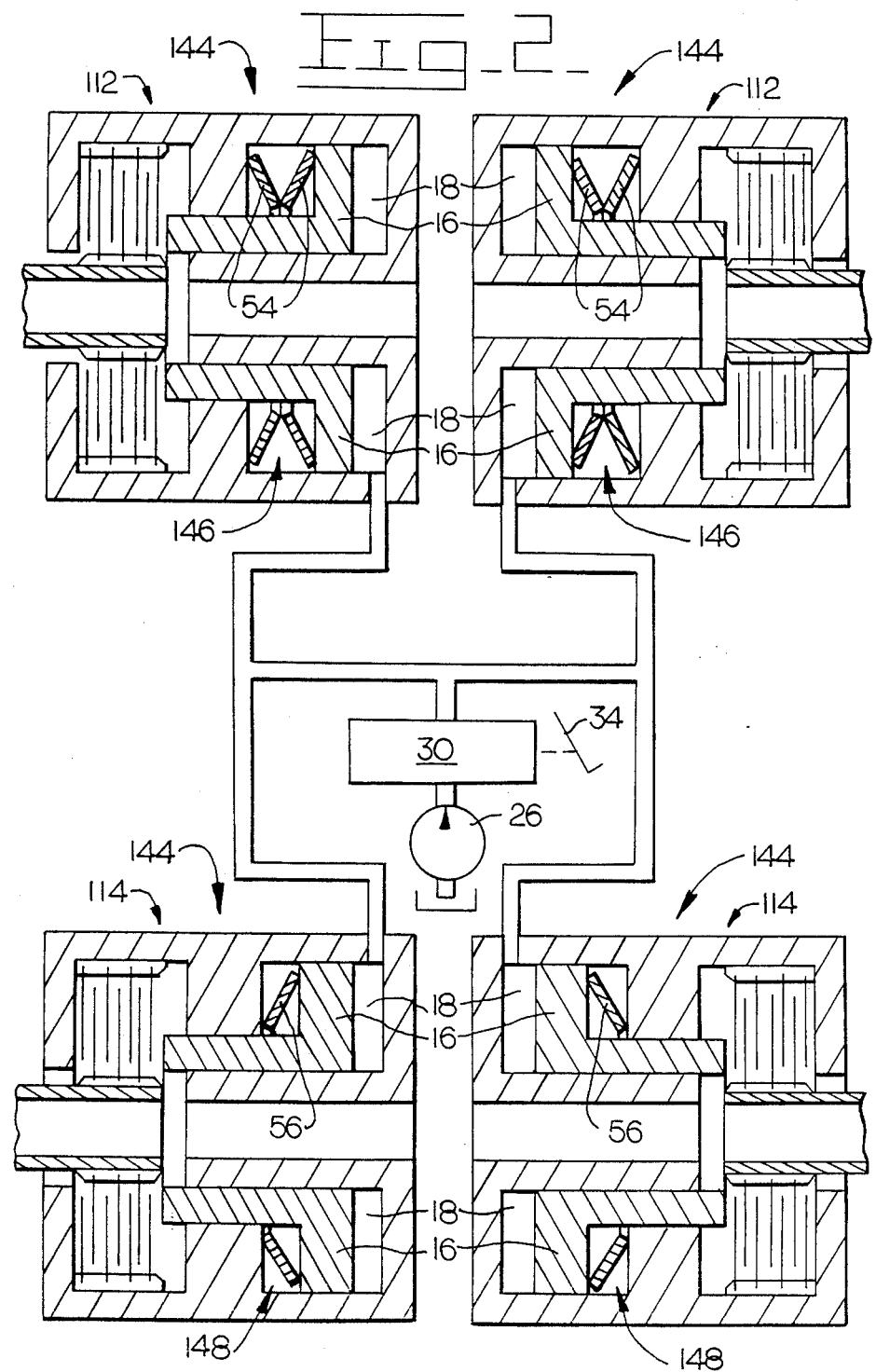

FRICTION BRAKE MECHANISM WITH AUTOMATIC SEQUENCING

This application is a continuation of application Ser. No. 07/045,264 filed Apr. 21, 1987, now abandoned, which application is a continuation of application Ser. No. 06/820,879 filed Jan. 16, 1986, now abandoned, which application is a continuation of application Ser. No. 06/562,941 filed Dec. 19, 1983, now abandoned.

TECHNICAL FIELD

This invention relates generally to a friction brake mechanism and more particularly to a system for sequentially operating a pair of front and rear brake assemblies.

BACKGROUND ART

Large material hauling vehicles and the like require effective braking under severe conditions. The oil cooled multi-disc friction brake is employed on such vehicle because of their maximum braking ability and long service life. Representative of the oil cooled friction brake arrangements are the following U.S. Pat. Nos.: 3,917,037 issued Nov. 5, 1975 to P.F.M. Prillinger and 3,927,737 issued Dec. 23, 1975 to P.F.M. Prillinger.

It is well known that for better steering control of large, heavy vehicles that the rear brake assemblies should be sequentially applied a predetermined period of time ahead of the front brake assemblies. Prior art brake arrangement have not heretofore provided for simple and economical means of automatic sequentially applying the rear brake assemblies a predetermined period of time ahead of the front brake assemblies without complicated and expensive valving and circuitry that adds complexity to the brake system with increased service requirements and increased operating expense. Other deficiencies of prior art brake arrangements include the lack of common components for both the front and rear brake assemblies thus requiring a greater number of parts be stocked for service.

The present invention is directed to overcoming one or more of the problems set forth above.

DISCLOSURE OF THE INVENTION

In one aspect of the present invention a friction brake mechanism for a vehicle includes a pair of front brake assemblies and a pair of rear brake assemblies, a plurality of brake plates and a plurality of brake disc interleaved with the brake plates, and a hydraulic control apparatus for selectively directing pressurized fluid to each of the front and rear brake assemblies. Mechanical force producing means associated with each of the brake assemblies cause the rear brake assemblies to automatically be sequentially applied a predetermined period of time ahead of the front brake assemblies without any alteration of the hydraulic control apparatus.

In another aspect of the invention each of the front and rear pair of brake assemblies having a brake piston moveable in a chamber between brake holding and releasing positions, and a plurality of brake plates and a plurality of brake disks interleaved with the brake plates. A first spring system having a predetermined force acts upon the respective brake pistons of the front brake assemblies and a second spring system with a predetermined force acts upon the respective brake pistons of the rear brake assemblies to cause the rear brake assemblies to automatically be sequentially applied a predetermined time ahead of the front brake assemblies irrespective of whether the brake mechanism is of the spring-applied hydraulically released type or the hydraulically-applied spring-released variety while accommodating a conventional hydraulic control apparatus without modification.

BRIEF DESCRIPTION OF THE DRAWINGS

FIG. 1 is a schematic illustration of one form of a spring applied hydraulically released brake mechanism constructed in accordance with the present invention; and FIG. 2 is a schematic illustration of a second form of a hydraulically applied spring released brake mechanism constructed in accordance with the present invention.

BEST MODE FOR CARRYING OUT THE INVENTION

As schematically shown in FIG. 1, a friction brake mechanism 10 for a vehicle (not shown), such as a truck or the like, includes a pair of spring applied hydraulically released front brake assemblies 12 and a pair of spring applied hydraulically released rear brake assemblies 14. Each of the brake assemblies 12 and 14 include a brake piston 16 movable in a chamber 18 and a plurality of brake plates 20 and a plurality of brake disks 22 which are interleaved and adapted to be axially compressibly engaged by the respective one of the pistons.

A hydraulic control apparatus indicated generally at 24 includes a source of pressurized fluid such as an engine driven pump 26 which normally delivers hydraulic fluid from a reservoir 28 to a control valve 30 via an outlet conduit 32. The control valve 30 is selectively operable, as for example by a foot pedal 34, to direct pressurized fluid to chambers 18 in each pair of front and rear brake assemblies 12 and 14. The control valve directs the pressurized fluid at the same time and at the same pressure to a supply conduit 36, which connects with a conduit 38 which in turn connects to a branch conduit 40 and a branch conduit 42.

The pressurized fluid delivered from the control valve 30 to the chamber 18 moves the brake pistons 16 in each of the brake assemblies 12 and 14 in a first predetermined direction. A mechanical force producing means 44 of relative high magnitude in opposing relationship to the pressurized fluid is created by a first spring system 46 associated with each of the front brake assemblies 12 and a second spring system 48 associated with each of the rear brake assemblies 14.

The first spring system 46 is comprised of, for example, a single coil spring 50 and the second spring system 48 is comprised of, for example, at least a pair of coil springs 52 to exert a force greater than the first spring system.

The construction of the second spring system 48 to produce a force greater than the first spring system 46 can be accomplished in several different ways. The easiest and most economical way is to provide a greater number of springs 52 in the second spring system 48 than in the first spring system 46 as shown in FIG. 1. For commonality of brake components the coil spring 50 in each pair of front brake assemblies 12 could be identical in construction to the coil springs 52 in each of the rear brake assemblies 14. The individual springs 52 in each of the rear brake assemblies could also be of a larger size than the spring 50 in the front brake assemblies. Likewise, the first and second spring systems 46 and 48 could be comprised of a plurality of individual Belleville springs (54,56) respectively with a greater number or larger size Belleville springs (56) provided in the second spring system 48.

Referring now to FIG. 2, like elements have been identified with the same reference numeral as in FIG. 1. A friction brake mechanism 10 is schematically shown and includes a pair of hydraulically applied spring released front brake assemblies 112 and a pair of pressure applied spring released rear brake assemblies 114.

This second form of the present invention differs from the first form of FIG. 1 in that a force producing means 144 comprised of a first spring system 146, associated with the pair of front brake assemblies 112, provides a greater mechanical force than a second spring system 148 associated with the pair of rear brake assemblies 114. The first spring system 146 is comprised of, for example, a pair of Belleville springs 54 with the second spring system 146 comprised of a single Belleville spring 56. The individual Belleville springs 54 in the first spring system 144 could also be of larger size than the individual Belleville springs 56 in the second spring system 148. It is also recognized that the force producing means 144 could be comprised of the single coil spring 50 in the second spring system 148 and a pair of coil springs 52 in the first spring system 146. Other types of springs of differing sizes and shapes could also be used.

The control valve 30 is selectively operable to direct pressurized fluid at the same time and pressure to chambers 18 move the brake pistons 16 toward brake holding engagement. The first and second spring systems 146,148 biases each of the brake pistons 16 toward a brake releasing position in the absence of a controlled fluid pressure from the control apparatus 24.

INDUSTRIAL APPLICABILITY

The friction brake mechanism 10 of the present invention is particularly adaptable to earthmoving vehicles such as trucks, scraper and the like.

The friction brake mechanism 10,110 can easily and inexpensively be installed on large earthmoving vehicles requiring no complicated valving or circuitry and utilizing many common components. The hydraulic control apparatus 24 actuated by foot pedal 34 and/or other means, such as a lever or switch, selectively directs pressurized fluid at the same time and same pressure to each of the front and rear brake assemblies 12,112,14,114.

In the spring applied pressure off brake system as illustrated in FIG. 1 actuation of the foot pedal 34 blocks fluid pressure at a controlled rate from the hydraulic control valve 30 to each pair of front and rear brake assemblies 12 and 14 in opposition to the first and second spring systems 46,48. The second spring system 48 develops a greater biasing force in opposition to the hydraulic control apparatus 20 than the first spring system 46.

As the fluid pressure is reduced to the chambers 18 the first and second spring systems 46,48 move the brake pistons 16 in each pair of brake assemblies 12 and 14 outward frictionally compressing interleaved brake plates 20 and brake disc 22 into brake holding engagement. With the second spring system 48 exerting a greater force, the pair of rear brake assemblies 14 are caused to be automatically sequentially engaged a predetermined time ahead of engagement of the pair of front brake assemblies 12.

In the pressure applied spring off brake system 110 illustrated in FIG. 2, actuation of the foot pedal 30 directs fluid pressure at a controlled rate from the hydraulic control valve 26 to each pair of front and rear brake assemblies 112,114 in opposition to the first and second spring system 146,148 for brake engagement.

The first spring system 146 develops a greater biasing force in opposition to the fluid pressure than the second spring system 148. As controlled rate pressurized fluid is directed to the chambers 18 in the brake assemblies 12 and 14 the brake pistons 16 in the pair of rear brake assemblies 114 moves a predetermined period of time ahead of the brake pistons 16 in the pair of front brake assemblies 112 because of the lesser biasing force causing brake holding engagement of the rear brake assemblies ahead of the front brake assemblies.

It is apparent that the friction brake mechanism 10 provides a simple economical brake sequencing arrangement for automatically applying the rear brake assemblies (14,114) a predetermined period of time ahead of the front brake assemblies (12,112) without any alteration of the hydraulic control apparatus 24 for either a spring-applied hydraulically released brake system or a hydraulically-applied spring released brake system.

Other aspects, objects and advantages can be obtained from a study of the drawings, the disclosure and the appended claims.

I claim:

1. A friction brake mechanism for a vehicle including a pair of spring applied hydraulically released front brake assemblies and a pair of spring applied hydraulically released rear brake assemblies, the improvement comprising;

each of the brake assemblies has a brake piston movable in a chamber between brake holding a releasing positions, a plurality of brake plates, and a plurality of brake disks interleaved with the brake plates and adapted to be axially compressibly engaged by the piston;

a first spring system acting upon the respective brake pistons of the pair of front brake assemblies and including one or more first springs collectively providing a first preselected biasing force which biases the respective one of the pistons toward the brake holding position in each of the front brake assemblies;

a second spring system acting upon the respective brake pistons of the pair of rear brake assemblies and including one or more second springs collectively providing a second preselected biasing force which biases the respective one of the pistons toward the brake holding position in each of the rear brake assemblies;

a hydraulic control apparatus for selectively controlling the pressure in the chambers at the same time and at the same pressure, to move the brake pistons in opposition to the first and second spring systems and for controllable depressurizing the chambers; and the second spring system developing a greater preselected biasing force than the preselective bearing force of the first spring system in opposition to the hydraulic control apparatus so that the rear brake assemblies are applied at a predetermined period of time ahead of the front brake assemblies and at a greater working force than the front brake assemblies throughout the entire range of braking.

* * * * *